UNITED STATES PATENT OFFICE.

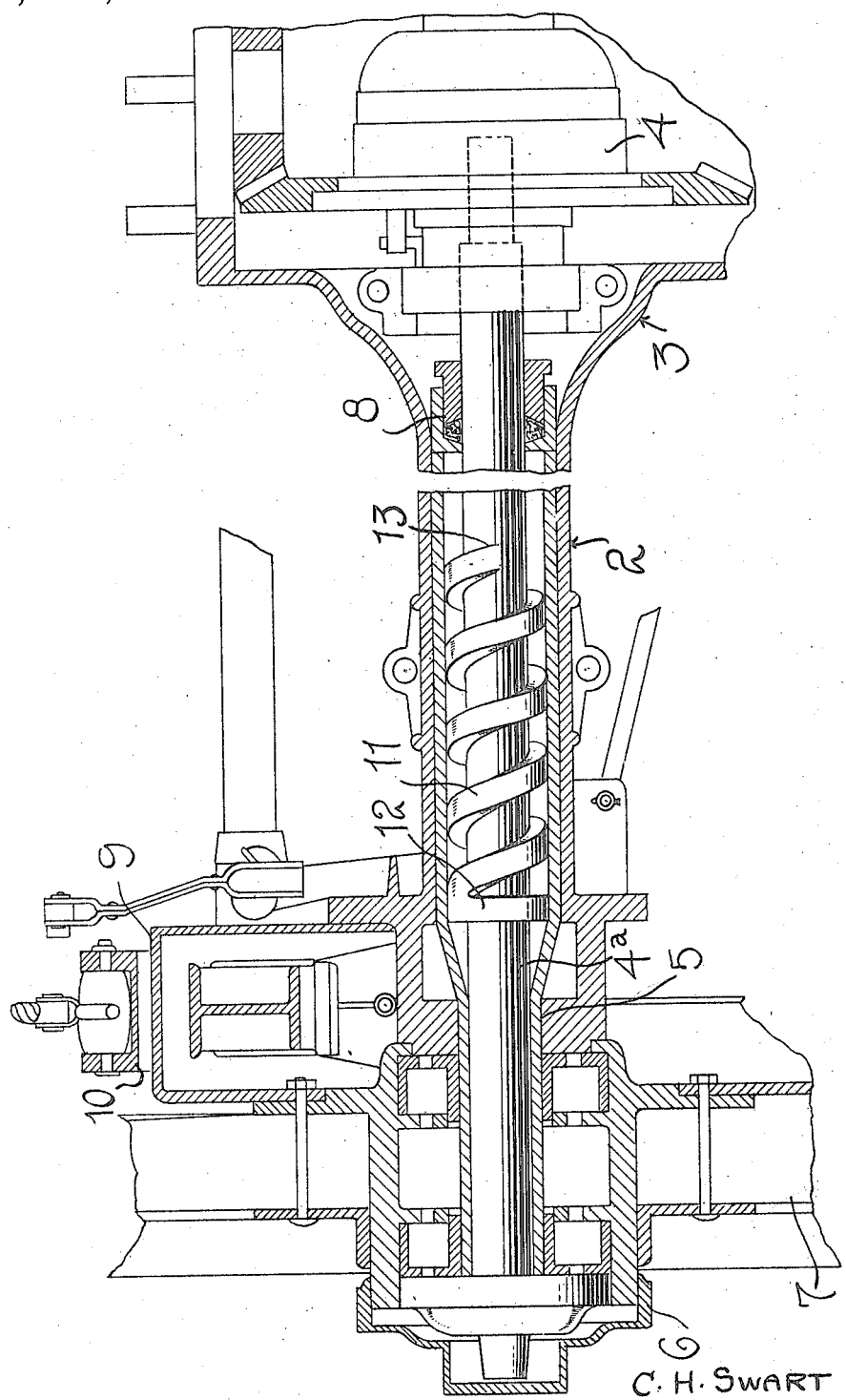

CLARENCE H. SWART AND ARTHUR M. TAILLEUR, OF DAYTON, NEVADA.

AUTOMOBILE-AXLE.

1,208,045.  Specification of Letters Patent.  Patented Dec. 12, 1916.

Application filed April 3, 1915. Serial No. 18,968.

*To all whom it may concern:*

Be it known that we, CLARENCE H. SWART and ARTHUR M. TAILLEUR, citizens of the United States, residing at Dayton, in the county of Lyon and State of Nevada, have invented certain new and useful Improvements in Automobile-Axles, of which the following is a specification, reference being had to the accompanying drawings.

Our invention relates to vehicle axles, and particularly to axles designed to be used on automobiles in connection with the differential thereof, and the primary object of our invention is the provision of an axle or axle section adapted for the purpose intended and so constructed as to prevent the lubricant from the differential box or casing from flowing outward along the axle and getting upon the brake disks or bands.

A still further object of our invention is the provision of means mounted in connection with the axle or axle section, for not only preventing the lubricant from passing from the differential outward along the axle, but further acting to positively force said lubricant in an opposite direction, thus not only impeding the passage of lubricant outward along the axle section, but constantly acting to force this lubricant in the other direction.

Other objects will appear in the course of the following description.

Our invention is illustrated in the accompanying drawings, wherein the figure is a longitudinal sectional view of the axle housing for an automobile, showing also a portion of the differential and showing the shaft with our invention applied thereto.

As shown, our invention is applied to the rear axle of an automobile, specifically the Overland car, though we do not wish to limit ourselves to the use of our device in this particular car, nor to the use of our device necessarily to the rear axle or to an automobile axle. The invention, however, is particularly adapted for the purpose of preventing the leakage of lubricant from the differential of an automobile and the passage of this lubricant outward along the axle where it is liable to come in contact with the brake mechanism.

In the drawing, 2 designates the usual housing of the automobile axle, which housing at its inner end is operatively connected to the housing which incloses the differential, this housing being designated 3. The differential 4 may be of any suitable construction and is not illustrated in detail. Extending into the differential from opposite sides are the axle shafts $4^a$. Inasmuch as both of these shafts are similarly mounted and have exactly the same character, the description of one of the shafts and its mounting will apply to the other. Only one of these axle sections or shafts is shown.

Each shaft $4^a$ at its outer end is rotatably supported in the outer end of the automobile housing which is contracted for this purpose at 5. Each shaft at its extremity carries the spider 6 whereby the shaft has engagement in the usual manner with the wheel 7, anti-friction bearings being disposed between the hub of the wheel and the housing, as is usual. The inner end of the housing may be constructed in any desired way, but preferably is provided with a stuffing box 8. While the stuffing box is intended to prevent the outward passage of the oil along the shaft, and while in many cases lubricant retainers of felt or other fibrous material have been used, these do not entirely prevent the outward passage of lubricant. This lubricant, in its outward passage, gets upon the brake drum 9 or brake band 10. This causes the brakes to slip. Eight out of every ten automobiles are liable to this trouble.

So far as described, the construction of the rear axle and its mounting is precisely the same as that found in the majority of automobiles, and in order to prevent the outward passage of lubricant along the axle section or shaft, we form upon the axle section or shaft 4 the helically disposed thread or a helically disposed flange 11. At the initial point of the helical flange there is formed a shoulder 12 which is preferably formed integral with the shaft, and from this the helical flange starts. The flange extends inward toward the inner end of the shaft or axle and the helix described by said flange is described in a direction reverse to the normal direction of rotation of the axle. In the figure for instance, the axle is intended to rotate in a counter-clockwise direction, and the helix therefore is wound in a clockwise direction. The flange for a number of convolutions has a uniform diameter but at its extremities gradually tapers down to the periphery of the shaft, as at 13. It will be obvious now that a rotation of the shaft in a counter-clockwise direction in the figure will cause the helical flange to rotate in such a direction as to continually urge any oil or other lubricant which may flow out upon the shaft inward, the edge of the flange bearing against the inner face of the housing and having a wiping engagement therewith. Thus any oil which may attempt to pass outward upon the axle or upon the housing will be positively carried inward, instead of being allowed to flow outward and get upon the brake drum and brake band, the spiral screw or helical flange working all surplus grease or lubricant back to the center of the axle.

It will be obvious that our invention is very simple and may be readily applied to all forms of automobiles, and in other situations where the same effect is desired to be secured, and we have found in actual practice that the helical flange is entirely effective for the purpose desired.

Having thus described our invention, what we claim is:

1. In an automobile, a shaft section, a housing therefor and uniformly spaced therefrom, a chamber containing oil through which the shaft section extends, and means for preventing the passage of the oil from said chamber along the shaft in one direction and along the inner face of the housing comprising a helical flange produced upon the shaft and described in a direction reverse to the direction of rotation of the shaft, the edge of the flange contacting with the housing, said flange terminating at its outer end away from said receptacle in a collar which contacts with the housing and said flange at its inner end adjacent the receptacle gradually merging into the shaft section.

2. In an automobile, a differential housing, a shaft housing extending therefrom, a shaft section disposed within said housing and spaced uniformly therefrom, and means for preventing the passage of oil from the differential housing along said shaft to the outer end of the shaft and along the inner shaft of the housing comprising a helical flange produced upon the shaft and described in a direction reverse to the direction of rotation of the shaft, the edge of the flange contacting with the housing, said helical flange terminating at its outer end away from the flange in an annular collar having its edge engaging with the housing.

3. In an automobile, a shaft section, a housing surrounding the section and terminating at its inner end in a lubricant containing chamber, a gland surrounding the shaft and engaging the housing, and means for preventing the passage of oil along the shaft from the lubricant containing chamber and preventing the passage of oil along the inner face of the housing comprising a helical flange produced upon the shaft and described in a direction reverse to the direction of rotation of the shaft, said flange having a transversely flat face, the edge of the face contacting with the housing and wiping thereagainst, said flange terminating at its outer end away from said receptacle in a collar contacting with the inner face of the housing and the flange at its inner end adjacent the gland gradually merging into the shaft section.

In testimony whereof we hereunto affix our signatures in the presence of two witnesses.

CLARENCE H. SWART.
ARTHUR M. TAILLEUR.

Witnesses:
A. C. PERKINS,
LELA E. STEVENSON.